Feb. 22, 1966 J. D. CONTI 3,235,906
FILM SPREADING APPARATUS
Filed June 18, 1964
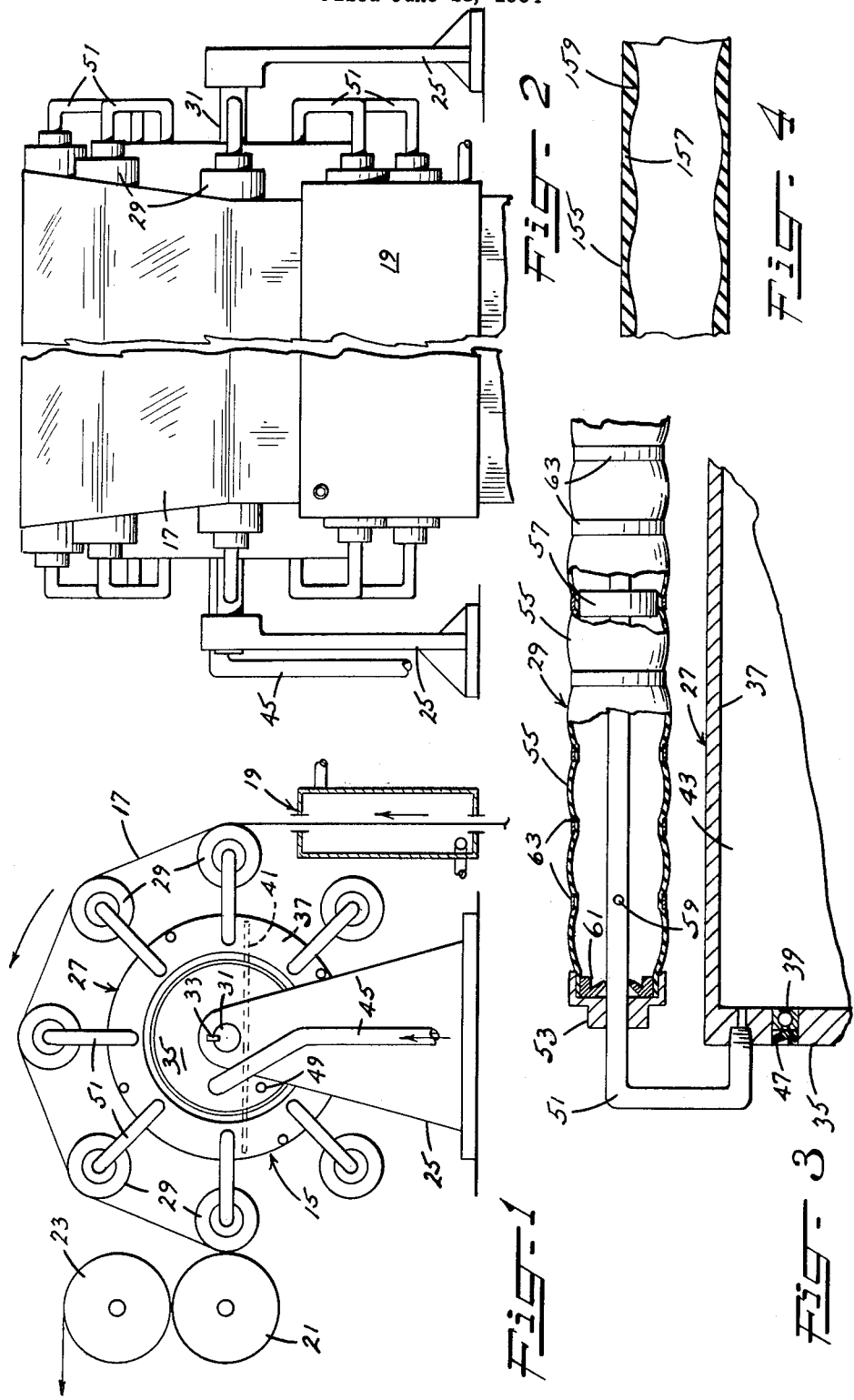

United States Patent Office 3,235,906
Patented Feb. 22, 1966

3,235,906
FILM SPREADING APPARATUS
John D. Conti, Elkins Park, Pa., assignor to FMC Corporation, Philadelphia, Pa., a corporation of Delaware
Filed June 18, 1964, Ser. No. 376,138
10 Claims. (Cl. 18—1)

The present invention relates to an improved film spreading or expanding apparatus.

In film coating, slitting and other chemical and mechanical operations it is desirable and necessary that the film being processed be in a wrinkle-free condition and/or be prevented from shrinking. While various equipment has been proposed for achieving such function, none has proven to be entirely satisfactory. For example, with certain of such equipment the degree of film spreading is limited, while with other known apparatus film embossing or other damage often results. Accordingly, a primary object of this invention is to provide a generally new or improved and more satisfactory film spreading or expanding apparatus.

Another object is the provision of an improved spreading apparatus which provides for a gradual and continuous lateral expansion of a film.

Still another object of the invention is an improved film spreading apparatus which allows for lateral expansion or spreading of traveling continuous films and good film tracking characteristics.

Still further objects will appear from the following description.

These objects are accomplished in accordance with the present invention by an apparatus which includes, in general, a plurality of longitudinally expandable rolls which are disposed in circular array and are individually rotatable about their respective axis and as a group about a common or central axis. The rolls are each formed of a thin-walled elastic sleeve which is designed to stretch longitudinally, in opposite directions from its center, when inflated with air or other gas. Each of the plurality of rolls is progressively inflated, concomitantly with its rotation about its common axis, until it reaches a position of maximum expansion, after which it is permitted to contract and assume a generally untensioned condition.

In laterally spreading or stretching a film with the apparatus of the present invention, the film is engaged with the peripheries of a series of adjacent expandable rolls, the first of which is in a generally untensioned condition while the last is expanded to about its maximum extent. The rolls inbetween the first and last roll of such series are expanded to different degrees, with each roll being expanded slightly more than the preceding roll of the series. Preferably, the progressive longitudinal expansion of the roll is effected continuously and concomitantly with the rotation of such rolls about the common axis. In this manner, a gradual and more uniform spreading of the film results.

The rotation of the expanding rolls about their respective axis and the rotation of the rolls as a group about the common axis may be achieved by the advancement of the film relative thereto or by some conventional means which drives the individual rolls and/or the group of rolls. The degree of film spreading may be controlled by varying such factors as the speed of the film advancement, the rate and extent of roll expansion and/or by altering the number of expandable rolls with which the film is engaged.

As heretofore noted, the stretching of the expanding rolls initiates from the center and extends outwardly from the opposite ends thereof so that no special film track problems are introduced. The expandable rolls are constructed to undergo little, if any, circumferential expansion when they are inflated. As a result the film is under a generally uniform longitudinal tension and experiences no substantial longitudinal stretching during the lateral expanding or stretching operation. If desired or necessary, the film leaving the apparatus of the present invention may be stretched in a longitudinal direction, in accordance with conventional procedures.

The apparatus of the present invention has utility with a variety of films and can be employed with different film handling equipment. For example, the apparatus may be used to eliminate edge curl and wrinkles from stretchable as well as non-stretchable films or may be employed to introduce lateral orientation of films formed of polymeric materials, as for example, polyethylene and polypropylene. While expandable rolls having smooth cylindrical surfaces are preferred to prevent embossing or other damage to the film which is being spread, such rolls may be roughened or grooved to improve their gripping properties, when especially smooth films are being processed. For the sake of simplicity and ease of description, the apparatus of the present invention is hereafter described as employed in the lateral spreading of a coated and freshly humidified regenerated cellulose film to render the same flat and wrinkle-free immediately prior to its being wound upon itself in roll form.

In the drawing, FIGURE 1 is a side view of the apparatus of the present invention;

FIGURE 2 is a front view of the apparatus shown in FIGURE 1;

FIGURE 3 is an enlarged view illustrating a portion of the apparatus in section; and FIGURE 4 is a view of a portion of a modified expandable roll which may be employed in the apparatus of the present invention.

Referring now to FIGURES 1-3 of the drawing, the spreading apparatus of the present invention is indicated at 15 as employed with a continuous film or web 17 of regenerated cellulose. The film 17 may be delivered for example, by a conventional coating apparatus and as illustrated is passed through a steam chamber 13 to first restore moisture into the film before attempting to laterally expand the same. Upon leaving the spreading apparatus 15, the film is laced about nip rolls 21 and 23 and may cooperate with a pair of similar rolls, not shown, for expanding the film longitudinally in a conventional manner.

The spreading apparatus of the present invention includes side frames 25, a drum 27 and a plurality of longitudinally expandable rolls 29. The drum 27 is carried by a shaft 31, which is keyed to 33 at at least one of the side frames 25, and includes a pair of discs 35 and a cylinder 37. The discs 35 are fixed to the shaft 31 and are provided with roller bearings 39 which permit the cylinder 37 to rotate relative thereto. A plate 41 is fixed to the discs 35 and divides the drum 37 into two sections. The upper drum section, indicated at 43, is filled with air or other gas under pressure which is delivered by a conduit 45. A flexible seal 47 is positioned between the respective drum discs 35 and cylinder 37 and cooperates with similar seals between the cylinder 37 and the plate 41 to maintain the drum section 43 substantially gas-tight notwithstanding rotation of the cylinder 37. The lower drum section, that is, the portion below the plate 41, is open to the surrounding atmosphere by holes 49 formed in the discs 35.

The plurality of expandable rollers 29 are preferably arranged about the drum 37 by conduits 51, the opposite side ends of which are supported by the cylinder 37 and sequentially open into the drum sections as the cylinder 37 is turned. These expandable rolls are of identical construction and include a pair of rigid annular end plates 53, a thin-walled sleeve or tube 55 and a divider 57. The sleeve 55 is formed of a highly elastic rubber or other like expandable material and is fixed to the opposite end plates 53 and the divider 57. The end plates 53, like the divider 57, are rotatable about the conduits 51 and are also slidable relative thereto when the sleeves 55 undergo longitudinal expansion or contraction.

The individual conduits 51 are provided with at least one opening 59 on opposite sides of the divider 57 for sequentially delivering and withdrawing air or other gas. Flexible seals 61 are provided adjacent to each of the end plates 53 to minimize the loss of the expanding gas at these areas. When inflated, radial expansion of the individual sleeves 55 is limited by a series of longitudinally spaced collars or bands 63. Preferably the peripheries of the roll sleeves 55 are of uniform and generally smooth texture but may be roughened or grooved to improve their gripping characteristics.

FIGURE 4 illustrates a modified elastic roll sleeve 155 having circumferentially extending, alternate thin and thick sections 157 and 159 respectively. The thin sections 157 permit the roll sleeve to expand or stretch in a longitudinal direction while the alternate thick sections 159 minimize lateral expansion of the sleeve in much the same manner as the collars or bands 63 of the roll shown in FIGURE 3.

In operation, the film 17 is laced through the steam chamber 19 over the spreading apparatus 15 and between the nip rolls 21 and 23. Air or other gas is delivered under pressure into the drum sections 43 through the conduit 45 after which the nip rolls 21 and 23 are set in motion. As the film 17 is advanced, it causes the rolls 29 with which it is engaged to rotate about their individual axis and also effects rotation of the drum cylinder 37 relative to the discs 35. If desired or necessary separate means may be employed for separately rotating the individual roll 29 and/or the drum cylinder 37.

The roll conduits 51 which communicate with the drum section 43 convey the air or other gas under pressure to the opposite sides of the dividers 57 of the respective rolls 29 to thereby expand the same longitudinally. The expansion of such rolls will be effected continuously and concomitantly with the rotation of the drum cylinder 37 so that the film which is engaged therewith will be gradually spread in a lateral direction. In other words, as the roll 29 with which the film 17 first engages is carried counterclockwise by the drum cylinder 37 to a point where the film 17 passes onto the nip roll 21, it is being continuously and gradually expanded in a longitudinal direction by the air or other gas which is delivered by the drum section 43. As a result, the film 17 undergoes a smooth lateral spreading during its advancement toward the nip rolls 21 and 23. As a fully expanded roll 29 moves beyond the plate 41, so that it now communicates with the roller drum section, the air or other gas is exhausted therefrom and the roll sleeve assumes an untensioned condition.

It will be apparent that the degree of lateral spreading of the film can be varied by changing such factors as the speed of film advancement and/or the pressure of the expanding air or other gas. For example, by increasing the speed at which the film 17 is advanced, the rolls 29 with which the film is engaged have less opportunity to become fully expanded so that the film 17 would undergo less lateral spreading. A similar result could be obtained, for example, by reducing the pressure of the expanding air or other gas.

It is to be understood that changes and variations may be made without departing from the spirit and scope of the invention as defined in the appended claims.

I claim:

1. Apparatus for laterally spreading a film including a plurality of rolls, each of said rolls including a shaft, end plates rotatably mounted on said shaft and slidable longitudinally thereof, and a sleeve formed of elastic material extending between and connected to said end plates, means for engaging a film with certain of said rolls and for advancing the same relative thereto, means for inflating said rolls in sequence so as to gradually expand the same longitudinally from an untensioned condition to a condition of maximum expansion whereby the film is frictionally gripped by the roll sleeves and gradually spread in a lateral direction, and means for evacuating said rolls in sequence after the expanded film is removed therefrom.

2. Apparatus for laterally spreading a film including a plurality of rolls disposed in a circular array, each of said rolls including a shaft, end plates slidable longitudinally of said shaft, and a sleeve formed of elastic material extending between and connected to said end plates, means for advancing a film into engagement with and relative to a series of adjacent of said rolls, said rolls being rotatable about their individual shafts and as a group about a central axis as the film is advanced relative thereto, means for longitudinally expanding said rolls in sequence from an untensioned condition at a first position at which they move into engagement with the film to a condition of maximum expansion at a second position at which they are moved out of contact with such film, and means for evacuating said rolls as they move beyond said second position.

3. Apparatus as defined in claim 2 wherein said rolls further include a central divider and wherein said rolls are expanded by an inflating medium which is introduced at opposite sides of said divider to effect longitudinal stretching of the rolls outwardly from the center thereof.

4. Apparatus as defined in claim 2 wherein said roll sleeve includes means for limiting radial expansion thereof.

5. Apparatus as defined in claim 2 wherein said roll sleeves are each formed with circumferentially extending alternate thick and thin sections in which the thick sections minimize radial expansion of said rolls while the thin sections permit the roll to expand in a longitudinal direction.

6. Apparatus as defined in claim 2 further including bands positioned at longitudinally spaced intervals along said rolls for limiting radial expansion thereof.

7. Apparatus for laterally spreading a film including a drum having a cylinder which is rotatable about the drum axis, a plurality of arcuately spaced conduits communicating with the interior of said cylinder and having straight portions which extend substantially parallel to the drum axis, each of said rolls including a pair of end plates slidable longitudinally of a straight portion of a conduit, and a sleeve formed of elastic material extending between and connected to said end plates, means for advancing a film into engagement with and relative to a series of adjacent of said rolls, said rolls being rotatable about the individual straight portions of said conduits and as a group about the axis of said drum as the cylinder is turned, openings along the straight portions of said conduits, means for introducing a gas under pressure into selected of said conduits and through the openings therein for longitudinally expanding said rolls in sequence from an untensioned condition at a first position at which they move into engagement with the film to a condition of maximum expansion at a second position at which they are moved out of contact with such film, and means for evacuating said rolls as they move beyond said second position.

8. Apparatus as defined in claim 7 further including a plate longitudinally dividing said drum into two sections, means for delivering the compressed gas into one of said sections whereby the conduits in communication therewith convey the gas to the rolls carried by such conduits, and wherein said evacuating means including openings in the other drum section which permit the escape of gas from the rolls carried by the conduits which are in communication therewith.

9. Apparatus as defined in claim 7 further including a divider positioned centrally of each of said rolls and wherein the openings in said conduits are located on opposite sides of said divider whereby said rolls are expanded outwardly of the opposite ends thereof when the gas is introduced therein.

10. Apparatus as defined in claim 7 further including means for limiting radial expansion of the individual rolls.

References Cited by the Examiner

UNITED STATES PATENTS

| | | | |
|---|---|---|---|
| 2,560,038 | 7/1951 | Trainer | 18—1 XR |
| 2,771,658 | 11/1956 | Morrill | 26—63 |
| 2,876,961 | 3/1959 | Cole et al. | |
| 2,952,893 | 9/1960 | Kalwartes | 26—63 |
| 2,978,740 | 4/1961 | Maier | 18—1 |
| 2,996,784 | 8/1961 | Young | 26—63 |

WILLIAM J. STEPHENSON, *Primary Examiner.*